United States Patent [19]
Butcher et al.

[11] Patent Number: 5,586,929
[45] Date of Patent: Dec. 24, 1996

[54] PRECISION CUT OFF MACHINE

[76] Inventors: Hayden L. Butcher; Karen N. Butcher, both of 21699 Swan Creek Rd., Merrill, Mich. 48637

[21] Appl. No.: 344,508

[22] Filed: Nov. 23, 1994

[51] Int. Cl.[6] ........................................................ B24B 3/00
[52] U.S. Cl. .......................... 451/213; 451/231; 451/548; 83/477.2
[58] Field of Search ..................... 451/138, 171, 451/204, 216, 226, 266, 276, 396, 392, 393, 213, 216, 212, 375, 406, 408, 450, 548; 83/435.1, 477.2, 466.1

[56] References Cited

U.S. PATENT DOCUMENTS

| | | | |
|---|---|---|---|
| 2,337,718 | 12/1943 | Hoppes | 451/231 |
| 2,514,826 | 7/1950 | Zuzelo | 451/213 |
| 2,763,967 | 9/1956 | Hardy et al. | 451/231 |
| 3,205,621 | 9/1965 | Davis et al. | 451/231 |
| 4,173,849 | 11/1979 | Mar | 451/231 |
| 4,376,356 | 3/1983 | Everett | 451/231 |
| 4,428,159 | 1/1984 | Sigetich et al. | 451/213 |
| 4,593,590 | 6/1986 | Gray | 83/477.2 |
| 5,092,082 | 3/1992 | Padberg et al. | 451/548 |

*Primary Examiner*—Bruce M. Kisliuk
*Assistant Examiner*—George Nguyen
*Attorney, Agent, or Firm*—Learman & McCulloch

[57] ABSTRACT

The precision cut off machine (10) includes a spindle shaft (24) rotatably journaled on a platform (12). A motor (30) drives the spindle (24) through a cogged belt (36) trained around cogged pulleys (38 and 40). A flexible abrasive cutting disk (64) is attached to the end of the spindle opposite the cogged pulley 40. A fixed workpiece support (70) with a disk slot (74) is pivotally attached to the platform (12) by a hinge assembly (72) and locked in place with the radially outer edge of the disk (64) in the slot. A pump (88) supplies coolant to a wand (92) for cooling a workpiece during cutting. A workpiece is placed on the support (70) and manually advanced for cutting. A fence assembly (116) can be employed to set the length of workpiece. To cut flagged and headed workpieces, a step riser assembly (154) can be used. The fence assembly (116) can be used with the riser (154). A v-block assembly (170 with an adjustable stop (210) can be used on the support (70). The v-block has adjustable disk guides (200 and 206).

20 Claims, 4 Drawing Sheets

PRECISION CUT OFF MACHINE

TECHNICAL FIELD

This invention is in a cut off machine for cutting mild steel workpieces rapidly and conveniently and for cutting difficult to cut workpieces such as hardened file material, dowel pins, key stock, high speed steel, bolts, steel tubing, stainless steel cable and other similar workpieces and, more particularly, in a cut off machine with a flexible abrasive cutting disk rotating at high speed about a spindle axis, a coolant wand and coolant pump for supplying coolant to a workpiece that is being severed and a fixed workpiece holder for supporting a workpiece on both sides of the cutting disk while the workpiece is manually held and moved toward the spindle axis.

BACKGROUND OF THE INVENTION

Cutting hard steel members is difficult. Mild steel can be cut by saws with teeth that are harder than the mild steel member that is to be cut. When the member to be cut is as hard as or harder than saw teeth, the member cannot be cut by a saw. Harder materials for cutting are found in abrasive grinding wheels.

Grinding wheels are usually rigid and relatively thick. To sever a hard member into two pieces with a rigid grinding wheel, it is necessary to grind a section of the member the width of the grinding wheel into small particles. Such grinding procedures waste material, take time and generate heat. Heat tends to anneal the workpiece adjacent to the severed end, thereby reducing strength of the workpiece. Heat also makes it difficult to manually hold or manipulate a workpiece.

Hardened steel members can also be severed by heat with a cutting torch. Cutting torches employing oxygen and acetylene gas remove a substantial quantity of material when employed in a torch to cut through a workpiece. Some cutters employing heat, such as plasma cutters, remove a relatively small quantity of material. All of the cutting systems employing heat leave a rough surface and tend to change the hardness of material adjacent to the cut. It is generally necessary to grind the end of a member after it has been cut by heat. Grinding can remove material that has been annealed and leave an undamaged surface adjacent to the cut. The additional grinding step is time consuming and adds cost.

Flexible abrasive cutting disks have been developed in recent years. These abrasive cutting disks make relatively thin, quick cuts. They can cut material that is too hard to be cut by some other systems. Abrasive cutting disks can also cut softer material such as mild steel conveniently and in less time than some previously employed cutting systems. Due to the flexibility of the disks, they can drift axially and cut in an incorrect position. High speed abrasive disks also generate heat. The heat may cause some annealing. A workpiece is usually held in a fixed position by a clamp or other holder and the cutting disk is moved into contact with the workpiece. Clamping takes time. Other cutters employ an expensive powered carriage for either the workpiece or the cutter disk for accurate cutting. The carriages do not solve the disk flexibility problem or the clamping problem.

SUMMARY OF THE INVENTION

An object of the invention is to provide a workpiece cut off machine that can sever a workpiece quickly and accurately. Another object of the invention is to provide a workpiece cut off machine with manual feed and a workpiece cooling system to eliminate annealing and permit manual holding and manipulation. A further object of the invention is to provide a workpiece holder that is manually advanced and positions and holds the cutting edge of a flexible abrasive cutting disk relative to a workpiece. A still further object of the invention is to provide a workpiece cut off machine that supports a workpiece on both sides of a flexible abrasive cutting disk as the workpiece is severed. A yet further object of the invention is to provide a workpiece cut off machine that does not require clamping of a workpiece. A still yet further object of the invention is to provide a workpiece cut off machine which permits quick cutter disk replacement without disturbing setup adjustments.

The precision cut off machine has a frame platform mounted on a support stand. The support stand incorporates leveling screws that accommodate machine support surfaces that are not flat. A spindle is journaled on the frame and is rotatable about a generally horizontal spindle axis. A motor is mounted on the frame with its output shaft rotatable about an axis that is parallel to and spaced from the spindle axis. Torque is transmitted from the motor to the spindle by a pair of cogged pulleys and a cogged belt. A flexible abrasive cutting disk is mounted on the spindle and rotates with the spindle. A fixed workpiece support is attached to the frame. The fixed workpiece support has a cutting disk slot that receives the radially outer portion of the cutting disk. The cutting disk slot allows the workpiece support to support a workpiece on both sides of a cutting disk. The support is needed to eliminate pinching of the cutting disk by the workpiece and damage to the cutting disk that can result from such pinching.

A cooling system is provided for cooling the workpiece while it is being cut to prevent heat treatment of the workpiece and burning the operator's hands. The cooling system includes a coolant reservoir, a pump, an adjustable coolant wand, a coolant collector and a coolant filter.

A workpiece that is to be severed where the length can vary somewhat may be manually placed on the workpiece support and advanced toward the spindle axis until it is severed. A fence can be employed to set the approximate length of the workpiece. Some workpieces, such as bolts, have a head on one end. A riser can be attached to the workpiece support to raise the shank of the bolt that is to be severed and provide space for the bolt head.

A v-block can be provided if it is necessary to accurately locate a cut by the cutting disk. The v-block has surfaces which contact the fixed workpiece support and guide the workpiece along a path perpendicular to the spindle axis. Surfaces in two intersecting planes position the workpiece on the v-block. A cutting disk slot is provided in the v-block for the entry of the cutting disk while the cutting disk is severing a workpiece. Adjustable cutting disk guides are provided on the v-block for positioning the cutting disk and the cutting disk slot relative to each other. An adjustable stop is provided on the v-block for accurately positioning the workpiece relative to the cutting disk slot. A v-block step riser is secured to the v-block for severing headed members such as rivets and bolts.

The foregoing and other objects, features and advantages of the present invention will become apparent in the light of the following detailed description of an exemplary embodiment thereof, as illustrated in the accompanying drawing.

DETAILED DESCRIPTION

Figure 1:
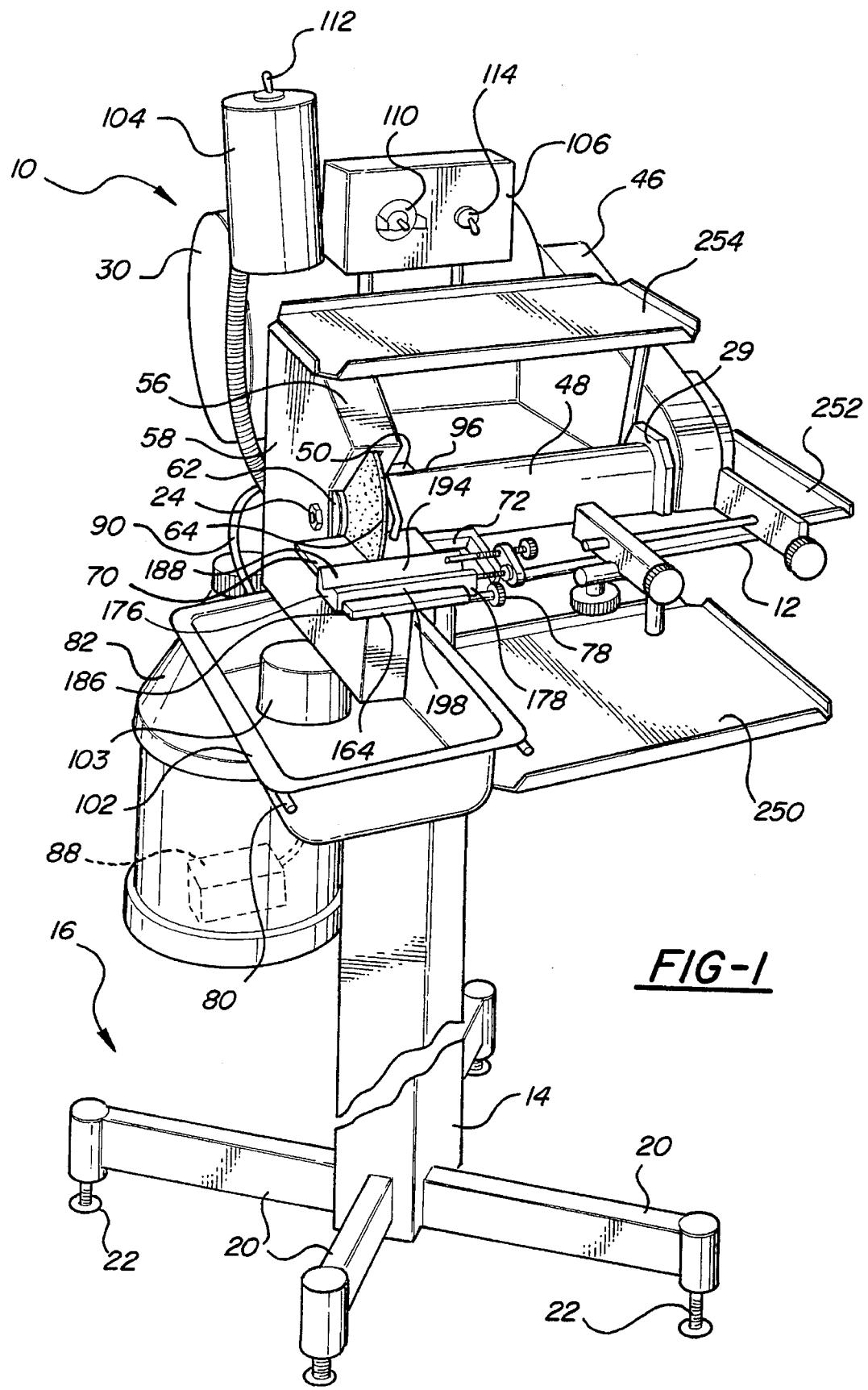
FIG. 1 is a perspective view of the cut off machine with portions broken away.

The precision cut off machine designated generally by the numeral 10 includes a frame platform 12. The platform 12 is attached to the tubular upright 14 of a support stand 16 by bolts. Four legs 20 are secured to and support the tubular upright 14. A leveling screw 22 is attached to the free end of each leg 20. The leveling screws 22 can be adjusted to maintain the platform 12 in a fixed, stable position, even when the cut off machine 10 is supported on a rough, uneven floor. The support stand 16 shown in the drawing is for a floor mounted cut off machine 10. If desired, a short support stand 16 could be employed for mounting on a work bench or table.

A spindle shaft 24 is rotatably journaled by two bearings 26 and 27 held in bearing blocks 28 and 29. The bearing blocks 28 and 29 are secured to the frame platform 12 by bolts. An electric motor 30 is mounted on the frame platform 12 to the rear of the spindle shaft 24. The output shaft 32 of the motor 30 rotates about an axis that is parallel to the spindle axis 34 that the spindle shaft 24 rotates about. A cogged belt 36 is trained around a cogged drive pulley 38 on the shaft 32 and a cogged driven pulley 40 on the spindle shaft 24 for rotating the spindle shaft. The drive pulley 38 is larger in diameter than the driven pulley 40 to drive the spindle shaft 24 up to 5400 revolutions per minute (r.p.m.). Pulleys 38 and 40 can also be employed that will drive the spindle shaft 24 at about 2750 r.p.m. The motor 30 is mounted on the frame platform 12 by bolts 42 that clamp the motor base 44 to the frame platform 12. The bolts 42 are loosened, the motor is moved away from the spindle axle 34 to tighten the cogged belt 36 and then the bolts 42 are re-tightened to maintain cogged belt tension. Cogged belts 36 are normally maintained at relatively high tension. A drive belt guard 46 is secured to the frame platform 12 to enclose the cogged belt 36. A shaft guard 48 encloses the shaft 24 between the bearing blocks 28 and 29 with the exception of a space for a spindle lock block 50. A spindle lock block 50 is clamped to the frame platform 12 adjacent to the bearing block 28 and completes the enclosure of the spindle shaft 24 between the bearing blocks 28 and 29. A spring loaded spindle lock pin 52 in the spindle lock block 50 can be manually forced against spring tension into engagement with one of the apertures 54 in the spindle shaft 24 to lock the spindle shaft.

A disk guard 56 slides over the end of the spindle shaft 24 opposite the driven cogged pulley 40 and is bolted to the bearing block 28 and to the platform 12. A disk guard door 58 is attached to the disk guard 56 by hinges 60. When the disk guard door 58 is opened, a spindle inner-flange 62, a flexible abrasive cutting disk 64, a spindle outer flange 66 and a nut 68 with left hand threads are attached to the spindle shaft 24. The spindle lock pin 52 is moved into engagement with one of the apertures 54 to keep the spindle shaft 24 from turning, while the nut 68 is tightened. The nut 68 must be sufficiently tight to clamp the flexible abrasive cutting disk between the spindle inner and outer flanges 62 and 66 and keep the cutting disk from rotating relative to the spindle shaft 24.

A fixed workpiece support 70 is attached to the frame platform 12 by a table hinge assembly 72. A slot 74 in the workpiece support 70 receives a radially outer portion of the flexible abrasive cutting disk 64 when the workpiece support is pivoted into a horizontal working position. A table pin 76, which is held in a bore in the rear edge of the workpiece support 70, engages the outer surface of the disk guard door 58 and locks the door closed. The lock screw 78 of the table hinge assembly 72 is tightened to lock the fixed workpiece support 70 in a horizontal working position. The lock screw 78 is loosened and the rear portion of the fixed workpiece support 70 is pivoted up and away from the cutting disk 64 to permit opening of the disk guard door 58 for cleaning, inspection and replacement of the cutting disk. The table hinge assembly 72 allows the fixed workpiece support 70 to be moved from the horizontal working position and returned to the same position without disturbing setup adjustments.

A pan bracket 80 is attached to the disk guard 56 and extends down below the flexible abrasive cutting disk 64. A plastic container 82 with an aperture through an upper wall portion is hung on a knob on one end of the pan bracket 80. A submerged electric coolant pump 88 is placed inside the plastic container 82. The pump 88 pumps coolant from the container 82 and through a tube 90 to a coolant wand 92. The coolant wand 92 includes a flat plate 94 with a pipe 96 soldered to one side. The flat plate 94 is clamped to the outside side surface of the disk guard 56 above the spindle shaft 24 by a spring 98. The spring 98 is attached to the disk guard 56 by bolts 100. The spring 98 can be a plate member or a bent rod member. A plastic plate 99 can be mounted between the spring 98 and the disk guard 56 to facilitate adjustments. The tube 90 is attached to one end of the pipe 96 and the other end of the pipe is angled downward and toward the cutting disk 64. By sliding the flat plate 94 under the spring 98, the discharge end of the pipe 96 can be positioned to direct coolant onto a workpiece near where the workpiece is being cut by the cutting disk 64. Coolant is caught in a coolant collector pan 102 supported by the pan bracket 80 after it cools a workpiece. Coolant caught in the coolant collector pan 102 passes through a filter 103 and is then returned to the container 82 through a tube. A light 104 is mounted on the disk guard 56 by a flexible pipe and bracket 105 and is positioned up above the workpiece support in a position where it can illuminate the workpiece.

A control panel 106 is attached to the electric motor 30. Current is supplied to the control panel 106 by a cable that is connected to an electrical receptacle. A motor switch 110, which is off in a center position, supplies current to the electric motor 30 and the light 104 in a top position and supplies current only to the light when in a bottom position. A separate switch 112 on the light 104 can be used to turn off the light when it is not needed. A coolant switch 114 on the control panel supplies current to the coolant pump 88 when coolant is required. The coolant switch 114 may be turned off when coolant obscures a mark or position on a workpiece that marks the location where the workpiece is to be cut.

To sever a workpiece with the precision cut off machine 10, the motor switch 110 is moved to its top position and the coolant switch 114 is turned on. A workpiece is manually placed on the fixed workpiece support 70 and, when the flexible abrasive cutting disk 64 is rotating at full speed, the workpiece is manually advanced slowly into the cutting disk 64. It is important not to feed the workpiece too fast. Too much force on the workpiece can damage or destroy the cutting disk 64. If a workpiece folds at the time it is almost severed, it can pinch the cutting disk 64 and destroy the cutting disk. The workpiece is supported on both sides of the cutting disk 64 to reduce the chance of pinching the disk.

Workpieces are often elongated members that are to be cut to a specific length. A fence assembly 116 can be employed to insure that the proper length is severed. The fence assembly 116 includes a c-clamp 118, an adjustment bar 120 and a broad stock stop 122. The c-clamp 118 is slid over the edge of the frame platform 12 with the bar 124 on top of the frame platform and an edge of the hexagon member 126 in contact with the front edge 128 of the frame platform. The c-clamp knob 130 is screwed into contact with the bottom of the frame platform 12 to secure the c-clamp 118 in a fixed position along the front edge 128. The adjustment bar 120 can pass completely through a bore 132 in the c-clamp 118. An adjustment bar clamp knob 134 screws into the bar 124 and locks the adjustment bar 120 in a select position relative to the c-clamp 118. The broad stock stop 122 has a bore 136 which can receive the adjustment bar 120. An adjustment bar clamp knob 138 screws into the stock stop 122 and clamps the stock stop in a selected position along the length of the adjustment bar 120. The stock stop 122 can be on either side of the c-clamp 118. If the c-clamp 118 is between the fixed workpiece support 70 and the stock stop 122, the upper surface 140 of the bar 124, which is in the same plane as the upper surface of the workpiece support 70, will become a workpiece support surface. The upper surface 140 functions as a workpiece support when a long workpiece is cut. If the stock stop 122 is between the fixed workpiece support 70 and the c-clamp 118, adjustment of the stock-stop 122 to positions closer to the flexible abrasive cutting disk 64 is limited by the table hinge assembly 72. To cut short workpieces, it may be desirable to have a fence closer to the cutting disk 64 than the stock stop 122 can be positioned, due to the table hinge assembly 72. In such a case, the short flange 142 of the stop extension 144 can be forced between the spring plates 146 and 148, bolted to the stock stop 122 and the side surface 150 and the long flange 152 can position the end of the workpiece. For cutting a very short section from a workpiece, the lower edge of the long flange 152 can be in contact with the upper surface of the fixed workpiece support 70.

Figure 5:
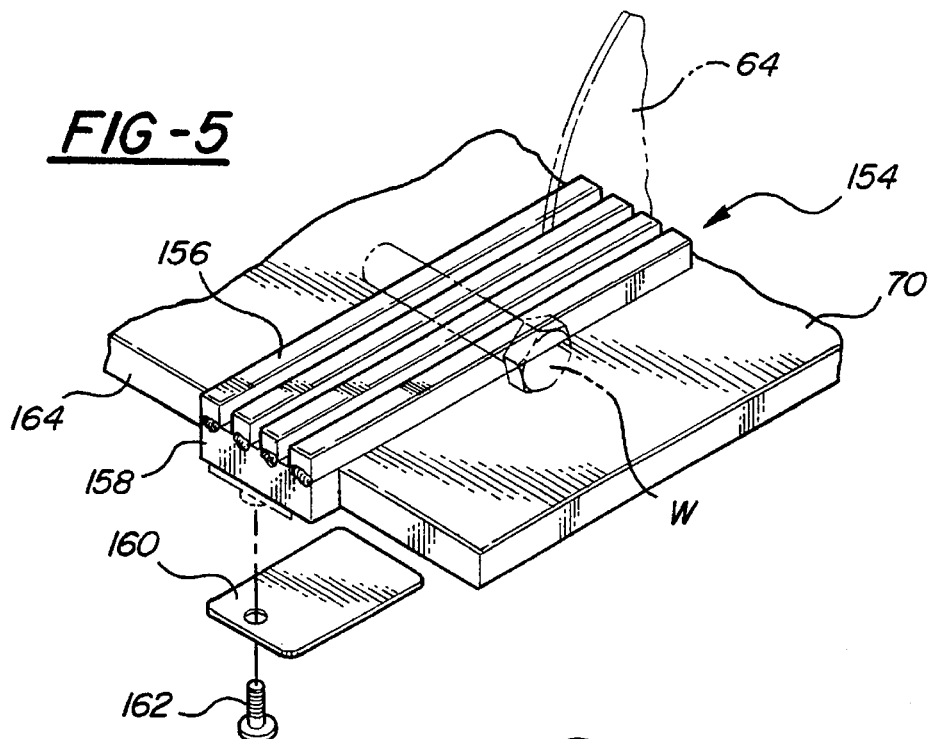
FIG. 5 is an expanded perspective view of the riser assembly and a portion of the stationary workpiece support.
Figure 6:
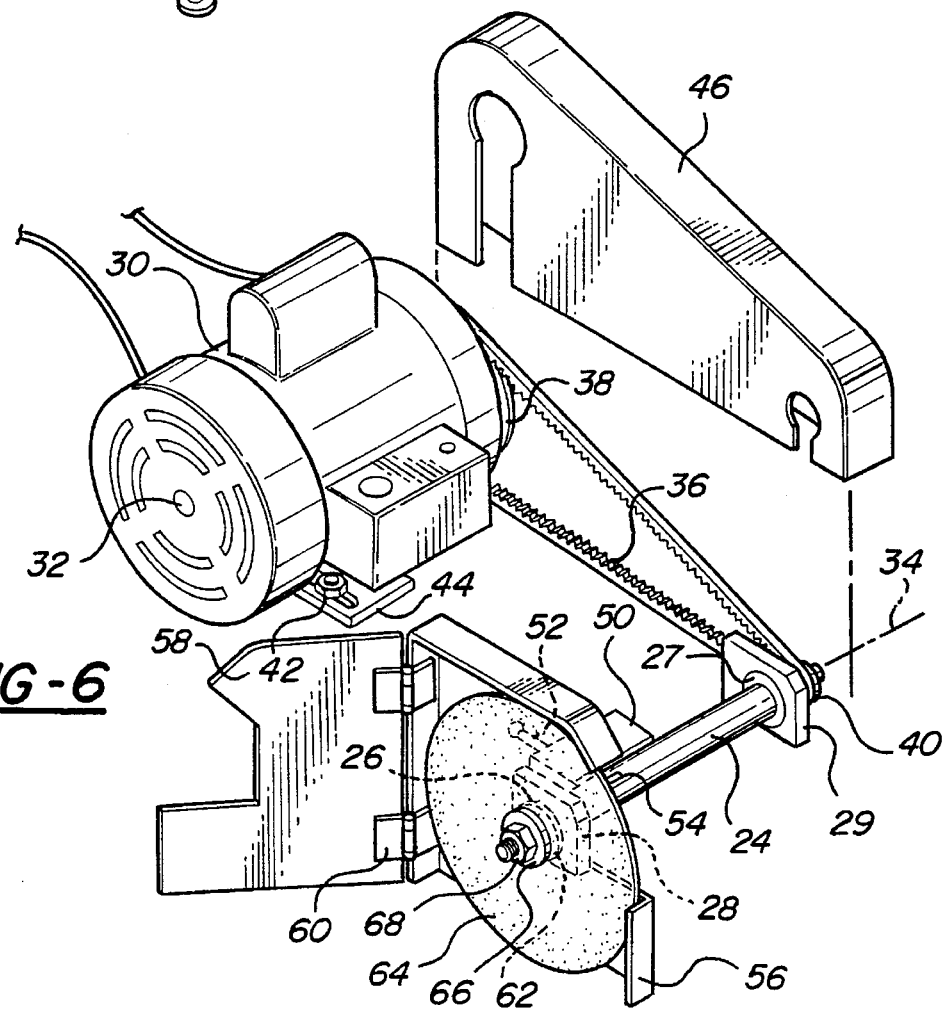
FIG. 6 is an enlarged perspective view of the spindle and spindle drive.

Some workpieces, such as bolts and rivets, have a head or flange. A head or flange may make it impossible for the workpiece to be in contact with a work surface adjacent to each side of the flexible abrasive cutting disk 64. Failure to properly support a workpiece on both sides of the cutting disk 64 can result in the workpiece pinching the cutting disk as explained above. A table step riser assembly 154 can be used to provide support for a headed workpiece as shown in FIG. 5. The riser assembly 154, as shown, includes four spaced-apart parallel bars 156 rigidly secured to a crossbar 158. A spring plate 160 is secured to the bottom of the crossbar 158 by a screw 162. The parallel bars 156 of the riser assembly 154 are placed on the upper surface of a fixed workpiece support 70 with any chosen one of the slots formed between the parallel bars 156 in line with the flexible cutting disk 64. The riser assembly 154 is then slid toward the cutting disk 64 until the disk is positioned in the aligned slot, the crossbar 158 contacts the front edge 164 of the workpiece support 70 and the spring plate 160 engages a lower surface of the workpiece support. The riser assembly 154 can be used in this position to support a headed or flanged workpiece while it is cut by the cutter disk 64.

A fence can be employed with the riser assembly 154 if desired. If the piece to be severed is short, the stop extension 144 can be reversed with the long flange 152 between the side surface 150 of the stock stop 122 and the spring plates 146 and 148 and with the lower edge of the short flange 142 in contact with the top of the riser assembly 154. For longer workpieces W with heads or flanges, the short flange 142 which functions as a fence can be moved away from the cutter disk 64. An even longer workpiece can be cut by removing the stop extension 144 and employing the stock stop 122 as a fence. The stock stop 122 cannot be positioned closer to the cutting disk 64 than the table hinge assembly 72, as explained above. When the c-clamp 118 is between the stock stop 122 and the cutter disk 64, a support riser 166 is secured to the upper surface 140 of the bar 124 by spring roll pins 168. The roll pins 168 are pressed into bores in the support riser 166 and slip into bores in the bar 124. The support riser 166 has the same vertical height as the bars 156 of the riser assembly 154 to support a workpiece in the same plane as the riser assembly 154.

A v-block assembly 170 is provided for holding and accurately positioning small workpieces relative to the flexible abrasive cutting disk 64. The v-block assembly 170 includes a v-block 172. The v-block 172 has a flat bottom surface 174. Flanges 176 and 178 are positioned at the sides of the surface 174. The flat bottom surface 174 engages the top surface of the fixed workpiece support 70, the side 180 of the flange 176 contacts the side 182 of the fixed workpiece support and the side 184 of the flange 178 contacts the side 186 of the workpiece support to guide the v-block during movement relative to the fixed workpiece support along a line perpendicular to the spindle axis 34. The flanges 176 and 178 are integral parts of the v-block 172 as shown in the drawing. If desired, the flanges 176 and 178 could separate pieces attached by fasteners or welding, separate flanges 176 and 178 could be round rods to reduce friction between the flanges and the sides 182 and 186 of the support 70. Some space is required between the side 180 and the side 182 and between the side 186 and the side 184 to prevent binding. If desired, one or more of the sides 180, 182, 184 and 186 could be adjustable, or even spring biased. A first flat workpiece support surface 188 is provided on the v-block 172 that is in a plane inclined about 20° from horizontal. A second, flat workpiece support surface 190 is provided on the v-block 172 that is in a plane perpendicular to the plane of the support surface 188. The intersection 192 between the first surface 188 and the second surface 190 is parallel to the spindle axis 34 when the v-block 172 is in a working position on the fixed workpiece support 70. A cutter disk slot 194 perpendicular to the intersection 192 passes through the first surface 188 and the second surface 190. A bore is drilled into the v-block 172 in line with the cutter disk slot 194 and adjacent to the second surface 190. A carbide cylinder 198 is secured in the bore 196 by an adhesive to form a stop that limits penetration of the cutter disk 64 into the cutter disk slot 194.

A screw 200 with a carbide tip 202 is screwed into a bore 204 on one side of the cutter disk slot 194. Another screw 206 with a carbide tip 208 is screwed into the bore 204 on the other side of the cutter disk slot 194. The two screws 200 and 206 are adjusted to center the cutter disk 64 in the cutter disk slot 194 and to provide some space between the carbide tip 202 and the carbide tip 208 for the passage of a cutter disk. During use of a cutter disk 64, the outer periphery of the cutter disk wears away and the disk diameter decreases.

As the diameter of the cutter disk 64 decreases, the axial thickness of the cutter disk decreases and it is necessary to adjust the screws 200 and 206 to decrease the space between the carbide tip 202 and the carbide tip 208. A workpiece that is to be severed is positioned in the v formed by the workpiece support surfaces 188 and 190. The motor 30 is turned on and the coolant pump 88 is turned on. The workpiece is then manually held on the v-block assembly 170 and the v-block assembly is manually moved toward the spindle axis 34 until the workpiece is severed.

Figure 2:
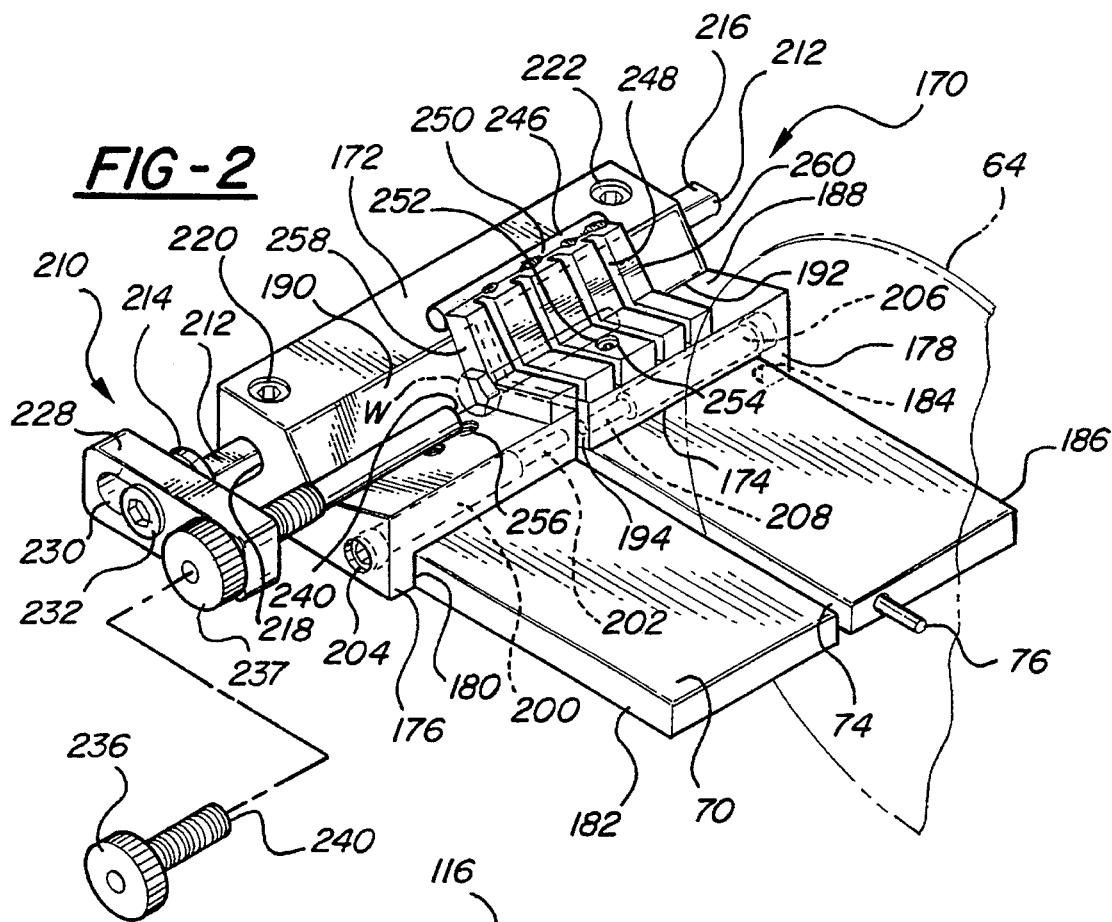
FIG. 2 is an enlarged perspective view of the v-block, v-block riser and the fixed workpiece support.
Figure 3:
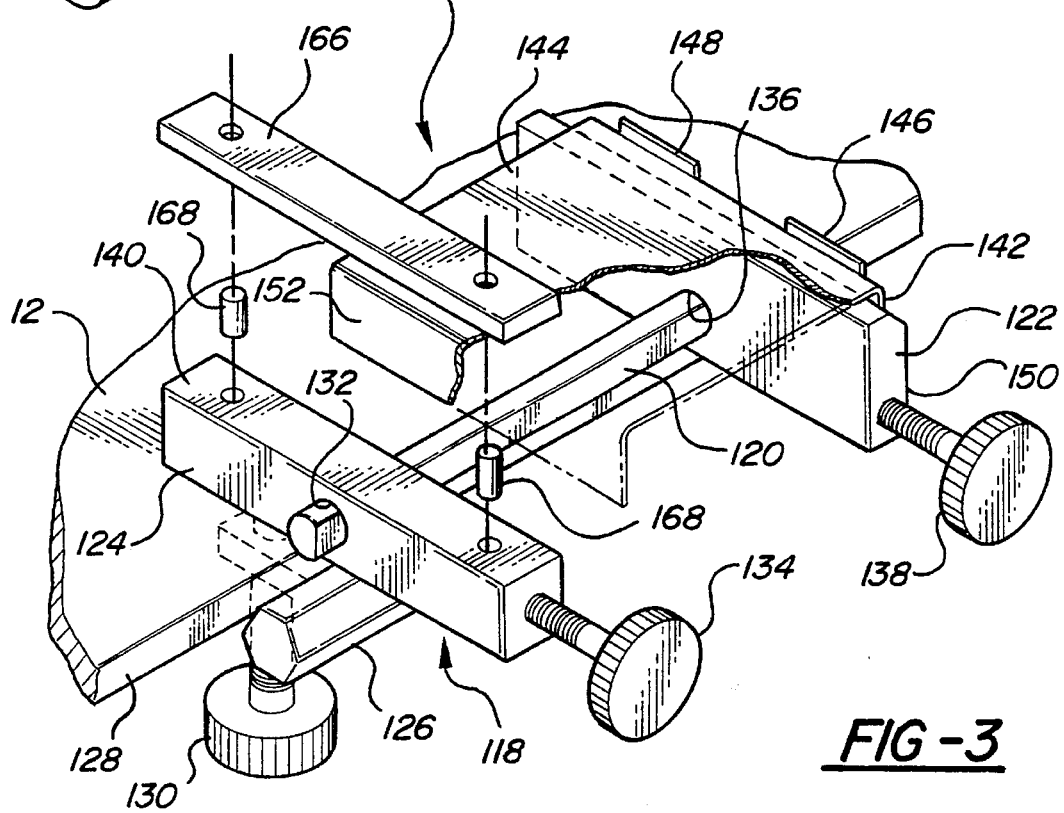
FIG. 3 is an enlarged perspective view of the fence assembly with parts broken away.
Figure 4:
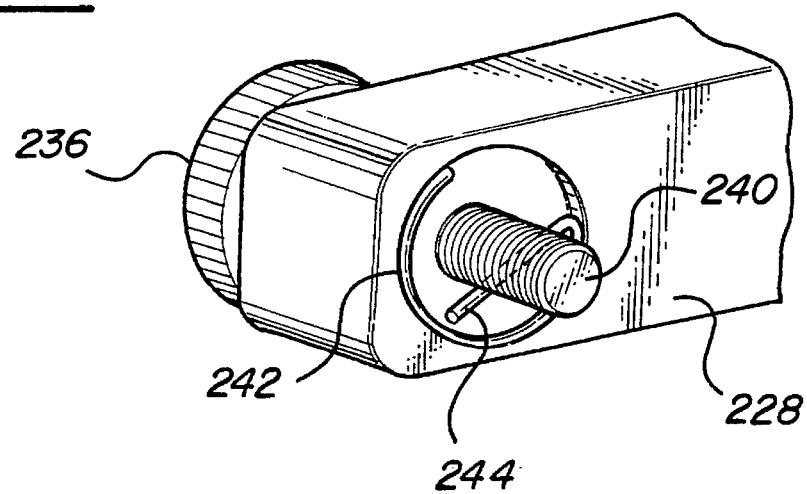
FIG. 4 is an enlarged perspective view of the arm of the stop assembly on the v-block with a portion broken away.
Figure 7:
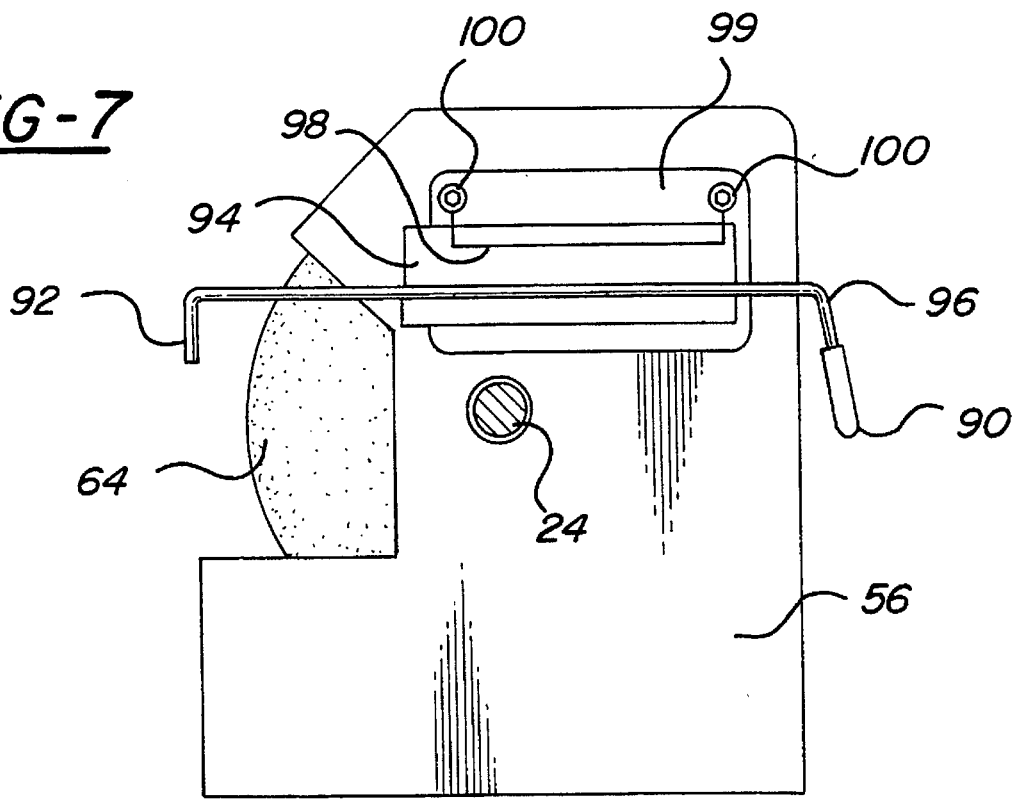
FIG. 7 is an enlarged elevational view of the disk guard and the coolant wand.

A stop assembly 210 can be attached to the v-block 172 if desired for accurately positioning a workpiece on the v-block. The stop assembly 210 includes an adjustment rod 212 with a flange 214 and a flat surface 216. The adjustment rod 212 is slid into a bore 218 through the v-block 172 from one end or the other. Adjustment rod locking screws 220 and 222 are then screwed into bores 224 and 226. At least one of the screws 220 and 222 contacts the flat surface 216 and locks the adjusting rod 212 in a selected position within the bore 218. A slot 230 in an arm 228 receives an end of the adjustment rod 212 and is clamped against the flange 214 and held in place by a screw 232 that screws into a threaded bore in an end of the adjustment rod 212. A precise adjustment screw 236 is screwed into a threaded bore 238 through one end of the arm 228. A stop surface 240 of the adjustment screw 236, as shown in FIG. 4, positions a workpiece W on the v-block 172 in a selected position. If the adjustment screw 236 is too short to properly position a workpiece, a longer screw 237 that can reach to a position near the cutter disk slot 194 can be used in the threaded bore, as shown in FIG. 2. A friction spring 242 is mounted in a shallow bore, eccentric to the threaded bore 238, on one side of the arm 228. A radially extending arm 244 on the friction spring 242 contacts the threads of the adjustment screw 236 to keep the adjustment screw fixed, except when being adjusted. A screw 220 or 222 is loosened and the adjustment rod 212 is repositioned to make large adjustments. Small adjustments are made with the precise adjustment screw 236 or 237.

The v-block assembly 170 can function as a riser when severing relatively long-headed or flanged workpieces. To sever shorter headed workpieces such as bolts and rivets, a v-block riser 246 is required. The v-block riser 246 is an L-shaped member with a plurality of cutter disk slots 248. A bar 250 serves as a handle and insures that the slots 248 do not separate the v-block riser 246. A bore 252 in the v-block riser receives a roll pin 254. During use of the v-block riser 246, the riser is seated on the v-block 172 with the roll pin inserted into one of the six bores 256. With the roll pin 254 in any one of the six bores 256, one of the cutter disk slots 248 is in alignment with the cutter disk slot 194 and the v-block 172 or an end surface 258 or 260 is adjacent to the cutter disk slot in the v-block. The end surfaces 258 and 260 of the v-block riser 246 can be used to position headed workpieces. The slots 248 and the bores 256 are arranged to provide standard fastener lengths. The stop assembly 210 can also be used with the v-block riser 246 if desired. The number of bores 256 and the number of cutter disk slots 248 in the v-block riser 246 can be changed if desired. The spacing between the bores 256 and between the cutter disk slots 248 can also be changed if desired.

A flexible abrasive cutting disk 64 with diamond abrasives must be used to cut workpieces made of carbide materials. Diamond abrasive cutting disks 64 with a diameter of six inches rotate at speeds of about 2,700–2,800 rpm. The flexible abrasive disks 64 without diamonds and a seven inch diameter are generally rotated at speeds up to 5400 r.p.m. The spindle shaft 24 can be slowed to the required speed for a diamond cutting disk 64 by changing the size of one or both of the pulleys 38 and 40.

The various fence and stop assemblies described above could be replaced by an electronic system with a digital readout, if desired. Such a system would eliminate the time required to adjust a fence. Once a workpiece is positioned according to the digital readout, the operator would have to maintain the workpiece in the desired axial position while manually moving the workpiece toward the cutting disk 64.

Shelves 250, 252 and 254 are attached to the cut off machine. The shelves are for operator convenience. Workpieces can be stored temporarily on the shelves. The fence assembly 116 and the v-block assembly 170 can also be stored on one of the shelves 250, 252 or 254 when not in use.

Preferred embodiments of the invention have been described in detail, but are examples only and the invention is not restricted thereto. It will be easily understood by those skilled in the art that modifications and variations can easily be made within the scope of the invention.

We claim:

1. A precision cut-off machine for cutting workpieces made from hard materials comprising a frame, a spindle rotatably journaled on the frame for rotation about a spindle axis of rotation, a motor supported by the frame and spaced from the spindle, a torque transmission drive connecting the motor to the spindle that is operable to rotate the spindle, a flexible abrasive cutting disk secured to the spindle and rotatable with the spindle, a fixed workpiece support pivotally attached to the frame adjacent to the flexible cutting disk for pivotal movement about an axis parallel to the spindle axis that is operable to support a workpiece while the workpiece is manually held and advanced to the flexible cutting disk, a slot in the fixed workpiece support perpendicular to the spindle that receives a portion of the flexible cutting disk, and a coolant wand adjustable supported on the frame adjacent to the flexible cutting disk, and a coolant pump connected to the coolant wand and operable to supply coolant to the workpiece while the workpiece is supported by the fixed workpiece support and manually advanced toward and cut by the flexible cutting disk.

2. A precision cut off machine as set forth in claim 1 wherein the frame includes a support stand with leveling screws.

3. A precision cut off machine as set forth in claim 1 wherein the spindle is rotatably journaled on the frame member by at least two bearings.

4. A precision cut off machine as set forth in claim 1 wherein the torque transmission includes a drive pulley mounted on the motor output shaft, a driven pulley mounted on the spindle and an endless cogged belt trained around the drive pulley and the driven pulley.

5. A precision cut off machine as set forth in claim 1 including a cutting disk guard and guard door for limiting access to the flexible cutting disk.

6. A precision cut off machine as set forth in claim 5 wherein the fixed workpiece support retains the guard door in a closed position when the guard door is closed and the fixed workpiece support is in position to support the workpiece while the workpiece is being cut.

7. A precision cut off machine as set forth in claim 1 including an adjustable fence attached to the frame and spaced a selected distance to one side of the flexible cutting disk to position the workpiece relative to the flexible cutting disk.

8. A precision cut off machine as set forth in claim 1 including a coolant collector supported by the frame in a position to catch coolant that has been supplied by the coolant pump and a conduit for directing coolant caught by the coolant collector to a sump where it can be resupplied to the pump.

9. A precision cut off machine as set forth in claim 16 including a coolant filter for filtering coolant supplied to the pump.

10. A precision cut-off machine for cutting workpieces made from hard materials comprising a frame, a spindle rotatably journaled on the frame for rotation about a spindle axis of rotation, a motor supported by the frame and spaced from the spindle, a torque transmission drive connecting the motor to the spindle that is operable to rotate the spindle, a flexible abrasive cutting disk secured to the spindle and rotatable with the spindle, a fixed workpiece support attached to the frame adjacent to the flexible cutting disk that is operable to support a workpiece while the workpiece is manually held and advanced to the flexible cutting disk, a coolant wand adjustable supported on the frame adjacent to the flexible cutting disk, a coolant pump connected to the coolant wand and operable to supply coolant to the workpiece while the workpiece is supported by the fixed workpiece support and manually advanced toward and cut by the flexible cutting disk; and a v-block slidably supported on the fixed workpiece support and guided along a path perpendicular to the spindle axis of rotation, a cutting disk slot in the v-block and first cutting disk guide mounted on the v-block and operable to contact a first side of the flexible cutting disk to axially position the cutting disk and the v-block relative to each other.

11. A precision cut off machine as set forth in claim 8 further including a second cutting disk guide mounted on the v-block and wherein the second cutting disk guide is operable to contact a second side of the flexible cutting disk and cooperate with the first cutting disk guide to axially position the cutting disk and the v-block relative to each other.

12. A precision cut off machine as set forth in claim 8 wherein the position of the cutting disk contact surface on the first cutting disk guide is adjustable relative to the cutting disk slot in the v-block.

13. A precision cut off machine as set forth in claim 9 wherein the position of the cutting disk contact surface on the first cutting disk guide and the position of the cutting disk contact surface on the second cutting disk guide are both adjustable relative to the cutting disk slot in the v-block.

14. A precision cut off machine as set forth in claim 11 including an adjustable stop attached to the v-block for axially positioning a workpiece on the v-block.

15. A precision cut off machine as set forth in claim 9 including a v-block step riser mounted on the v-block for positioning headed workpieces such as bolts relative to the v-block.

16. A precision cut off machine as set forth in claim 12 including a positioning member for axially positioning the v-block step riser relative to the v-block.

17. A precision cut off machine as set forth in claim 14 wherein the positioning member includes a projection on the v-block step riser that is received in one of a plurality of apertures in the v-block to axially position the v-block step riser in one of a plurality of positions relative to the v-block.

18. A v-block assembly for supporting and guiding a workpiece as the workpiece is moved toward a rotating flexible abrasive cutting disk including a v-block, a guide and support surface on the v-block for guiding and supporting the v-block along a path perpendicular to an axis of rotation of a rotating flexible cutting disk, a cutting disk slot in the v-block for the passage of the cutting disk, a first cutting disk guide supported on one side of the cutting disk slot operable to contact the cutting disk and limit movement of the cutting disk in a first direction perpendicular to the cutting disk slot, a second cutting disk guide adjustably supported on the second side of the cutting disk slot operable to contact the cutting disk and limit movement of the cutting disk in a second direction perpendicular to the cutting disk slot, and a pair of workpiece support surfaces on the v-block operable to support a workpiece on both sides of the cutting disk slot.

19. A v-block as set forth in claim 18 wherein the first cutting disk guide is adjustably supported on a first side of the cutting disk slot for adjustable movement toward or away from the second cutting disk guide.

20. A v-block assembly as set forth in claim 18 including an adjustable stop attached to the v-block to position a workpiece on the workpiece support surfaces.

\* \* \* \* \*